2,712,620

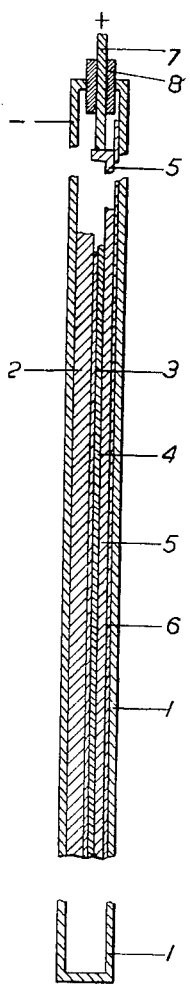

BLOCKING LAYER RECTIFIER AND HOUSING THEREFOR

Anton Frans Marlet, The Hague, Netherlands, assignor to International Standard Electric Corporation, New York, N. Y., a corporation of Delaware Application August 10, 1954, Serial No. 448,849

6 Claims. (Cl. 317—234)

The present invention relates to the encasing of blocking layer type rectifier cells such as for example selenium rectifiers, as a protection against ambient air or ambient cooling liquids.

In one construction of this type the blocking layer plates are enclosed within a box and are pressed against each other and against the walls of the box by means of a central nut and bolt. The walls of the box serve as one current conductor leading to the cell, the other current conductor being the central bolt which protrudes through the walls of the box and is insulated therefrom. The cell in turn makes electrical contact with the wall of the box by being pressed thereagainst by the bolt. In order to establish sufficient contact with the wall of the box, the wall must have considerable rigidity, which in practice leads to a box composed of relatively thick walls. Moreover there is a tendency for the rectifier plates to separate from the wall at distances remote from the central bolt thereby leaving an air space between, which acts as a heat insulator thereby preventing proper cooling of the rectifier plates. This is particularly true when the rectifier plates are of large dimensions.

There are a number of additional problems presented by boxes of this known type. For example, when the box is soldered to hermetically seal it, it is difficult to prevent the blocking layer from being overheated via the thick walls of the box. Furthermore the lead-in bolt arrangement is complicated and it is difficult to make the box airtight at the entry point of said bolt. Another disadvantage of this construction is that when such cells are placed in the cooling water tank, at least one of the ends of the bolt must be led through the wall of the tank. This is the only practical manner for giving a surface of equal potential to the submerged part of the construction. According to the Belgian Patent No. 502,680 issued October 20, 1951, of A. F. Marlet 8 for "Dry Surface Rectifier" this is necessary in order to prevent electro-chemical corrosion in the water tank. The lead through the tank wall, however, makes it impossible to lift a box from the water tank for the purposes of inspection or removal of scale deposit.

An object of the present invention is to substantially eliminate the objections hereinabove mentioned and to produce an encasing of a rectifier cell which is economically satisfactory and practically efficient.

In accordance with a main feature of the present invention a thin flexible walled box is employed whose inside is maintained at a permanent lower pressure than the surrounding atmosphere or fluid.

In accordance with another feature of the present invention the bolt and nut construction is eliminated and by the use of a lower pressure and flexible walls of the box, the walls are caused to be pressed inwardly and make satisfactory pressure against the rectifier cell without the use of any pressure producing agent.

The above-mentioned and other features and objects of this invention and the manner of attaining them will become more apparent and the invention itself will be best understood, by reference to the following description of an embodiment of the invention taken in conjunction with the accompanying drawings, wherein the figure is a cross-section of a box enclosing a set of blocking layer plates. The preferably thin walls of an airtight metal box are shown by the reference number 1 which said box may contain one or more superimposed blocking layer plates. The figure shows in addition to the upper and bottom end of the box the intermediate portion in broken-off condition; this intermediate part may comprise one or more superimposed blocking layer plates, one of which is shown but incompletely for the sake of simplicity, in which the base plate is indicated by 2 and the semi-conductor with blocking layer by 3. At the blocking layer side of the plate the current is taken off by means of a metal, for instance copper plate 5 which directly lies against the conducting layer of the counter electrode 4 which is usually provided on the blocking layer. At several places the plate 5 may be slightly depressed to ensure a reliable pressure contact with the counter electrode 4. The plate 5, which in the embodiment shown is the positive current collector, is at the other side of the wall of the box separated by means of an electro-insulating layer 6. In view of the relatively small potential differences, which in practice will occur between 5 and 1, a very thin layer 6 may already be sufficient. If, moreover, this layer consists of a substance which reasonably well conducts heat, for instance impregnated glass fabric, the temperature difference between the metal plates 5 and 1 will only be small. In this manner the heat generated in the blocking layer plate may be radiated not only in the direction of the base plate 2 but also in the direction of the positive current collector 5 and via the walls 1 to the surrounding medium. It is essential that the complex of layers 1—2—3—4—5—6—1 are pressed together all over the entire surface at a sufficient pressure, not only in order to promote mutual heat transfer but also in order to guarantee a sufficient electrical contact between the layers 1 and 2 and 4 and 5 respectively for the passing electric current. A uniformly distributed pressure over the entire surface is established in accordance with the invention by the fact that after having hermetically sealed the box, the air is sucked out of the interior through a suitable hole (not shown) so that inside the box a subpressure will be produced with respect to the surrounding medium, after which the said hole is sealed airtightly. The thickness of the walls of the box need not be larger than is necessary for maintaining airtightness which strongly reduces the expenses of material of the encasing. Due to this small thickness of the wall, it will accurately follow the surface inequalities of the enclosed parts so that an intimate contact is obtained.

The subpressure to be applied needs not to be a complete vacuum in general and it may be chosen in such a manner that on one hand the local pressure all over the contacting surface between the layers 4 and 5 does not yet become so high that the chance of pressing through, resulting in a short circuit between the semi-conductor and the blocking layer, might be produced, and on the other hand the pressure will be high enough so as to guarantee an intimate contact between the various layers.

The positive current collector plate 5 is insulatedly connected through the wall 1 of the box to the exterior e. g. insulated at 7, by the construction shown. This lead through, preferably by means of ceramic insulators 8, in the case of immersion of the box into a cooling liquid, is preferably provided, however, at the top so that the outlet 7 protrudes above the liquid and the submerged part of the box forms an equipotential surface as meant in the above cited Belgian Patent No. 502,680.

According to another embodiment of the invention the blocking layer plate or plates appearing in the figure is or are reversed so that then the sequential order of the plates becomes 1—4—3—2—6—1. The conductor led through at 7 is then negative while the positive pole is connected to the exterior metal surface of the box.

In accordance with a third embodiment of the invention, the rarefying of the box space is applied to a complex as shown in the figure in which the layer 6 is omitted whilst instead thereof a second blocking layer plate or respectively a second series of blocking layer plates facing 5 with a positive blocking layer side, is enclosed in the box 1. With this variant one cannot obviously expect that the blocking layer plates are each cooled towards two sides and then the electric current collector plate 5 should have a multiple of the thickness with respect to that in Fig. 1; the plate is then no longer cooled by the cooling liquid via the wall 1.

Another series of variants of constructions to which the invention may be applied in the embodiments described in the previous examples, are those in which the base plate or base plates of the blocking layer plates is or are formed by the walls of the box. If the wall used as one of the rectifier plates is thick and inflexible, the other wall may be made thin and flexible to provide adequate contact thereat inward with the pressure thereof on the plates.

Amongst the principal advantages obtained by applying a subpressure inside the box in accordance with the invention is the achievement of an electric contact pressure between the various components without necessitating screw pieces and piercing of the wall of the box.

As a general advantage of the construction according to the invention as described above, it may be noted that the encased blocking layer plates need not be provided with a hole insulated with respect to the blocking layer which increases the operation safety of the entire construction and lowers the manufacturing cost.

As a further advantage inherent to rarefying a thin walled box in accordance with the invention, it may be noted that the physical strength of the unit is comparable with the strength of a single plate having a thickness equal to the total of the component layers. Something similar also applies with respect to the rigidity against damages from exterior sources. This enables one to construct a rectifier from a plurality of similar flat boxes, placing the complex without further support in a cooling water tank and if necessary even during service to lift the various boxes from the tank one by one in order to remove scale deposits on the wall of the boxes. This inspection and cleaning may just take place efficiently and quickly in constructions according to the invention, because due to the rarefying no protuberances are present on the wall of the box.

The application of a very thin flexible walled box which has become possible in accordance with the invention, also yields the advantage that the box may be soldered tightly without involving that the tin plate conveys the heat developed, in an undesirable manner to the vulnerable blocking layer.

An additional advantage of the rarefying in accordance with the invention is formed by the circumstance that if the box is provided with a pressure indicator, for example a simple manometer, a leak in the wall may be detected at once and the box in question may then be taken out of the liquid tank before the penetrating water has damaged a large part of the enclosed blocking layer plates.

While I have described above the principles of my invention in connection with specific apparatus, it is to be clearly understood that this description is made only by way of example and not as a limitation to the scope of my invention as set forth in the objects thereof and in the accompanying claims.

I claim:

1. A blocking layer rectifier arrangement comprising a hermetically sealed box having on the inside thereof a rectifier, said rectifier having at least one plate loosely arranged within the box, characterized by at least one thin readily-bendable side wall of the box and a reduced air pressure within the box sufficient to cause the external pressure to force the side wall inwardly and press the parts of the rectifier together.

2. A blocking layer rectifier according to claim 1 in which said box has opposed thin side walls and said rectifier consists of a plurality of loosely arranged plates, said plates being maintained in contact with each other by the external pressure exerted on the thin side walls of the box.

3. A blocking layer rectifier according to claim 1 wherein the base plate of said rectifier is one of the side walls of the box and an insulating plate is interposed between the counter electrode and the opposite side walls of the box.

4. A blocking layer rectifier according to claim 1 wherein said box is made of metal and one of the rectifier plates is in immediate electrical contact therewith over substantially its entire length.

5. A blocking layer rectifier according to claim 4 wherein said rectifier includes a counter electrode, a conducting metal plate with contact with said counter electrode, and an insulating layer between said plate and the adjacent side wall.

6. A blocking layer rectifier according to claim 4 further comprising means for making electrical contact with the rectifier plate not in contact with the wall of the box including an aperture in the top of the box, an insulator in said aperture and a lead-in passing through said insulator, said lead-in and insulator forming at least part of a hermetic seal of said aperture.

References Cited in the file of this patent

UNITED STATES PATENTS

| | | |
|---|---|---|
| 2,569,306 | Hansson | Sept. 25, 1951 |
| 2,661,447 | Hall | Dec. 1, 1953 |